[19] United States Patent
Fukuda et al.

[11] 4,364,041
[45] Dec. 14, 1982

[54] CONTRAST CONTROLLABLE ELECTROCHROMIC DISPLAY DRIVER CIRCUIT

[75] Inventors: Hiroaki Fukuda, Nara; Shigeki Imai, Tenri, both of Japan

[73] Assignee: Sharp Kabushiki Kaisha, Osaka, Japan

[21] Appl. No.: 257,419

[22] Filed: Apr. 24, 1981

Related U.S. Application Data

[63] Continuation of Ser. No. 56,629, Jul. 11, 1979.

[30] Foreign Application Priority Data

Jul. 12, 1978 [JP] Japan .................................. 53-85552
Jul. 12, 1978 [JP] Japan .................................. 53-85553

[51] Int. Cl.³ .............................................. G09G 3/16
[52] U.S. Cl. .................................. 340/785; 340/812; 350/357
[58] Field of Search ................................. 340/785, 812

[56] References Cited

U.S. PATENT DOCUMENTS 4,153,344 5/1979 Hamada et al. ..................... 350/357
4,160,241 7/1979 Shimizu et al. .................. 340/785 X
4,201,984 5/1980 Inami et al. ........................ 340/812 X
4,201,985 5/1980 Inami et al. ........................ 340/812
4,302,751 11/1981 Nakauchi et al. ............... 340/785 X

FOREIGN PATENT DOCUMENTS 2825390 12/1978 Fed. Rep. of Germany ...... 350/357

OTHER PUBLICATIONS

Giglia, "Features of an Electrochromic Display Device," American Cyanamid Co. Research Div., 1976, 13 pages.

Primary Examiner—David L. Trafton
Attorney, Agent, or Firm—Birch, Stewart, Kolasch & Birch

[57] ABSTRACT

A circuit for providing a constant coloring current to a plurality of segment electrodes of an electrochromic display comprises a plurality of switching elements, say, transistors respectively connected to the segment electrodes for enabling the application of the constant coloring current to the segment electrodes, and an element for changing switching timings of the switching elements. A desirable amount of charge derived from the constant coloring current is applied to the segment electrodes regardless of the presence of the variations in electrical properties of the respective switching elements. In another form of the present invention, the changing element comprises a generator for generating a constant voltage, and a modifier for modifying a value of the constant voltage. In a further form of the present invention, the sizes of the respective switching elements, say, MOS transistors can be changed so that the factor W/L (W: the width of a channel of one of the MOS transistors, and L: the length of the channel) is selected so as to be proportional to the dimensions of the corresponding segment electrodes.

6 Claims, 2 Drawing Figures

CONTRAST CONTROLLABLE ELECTROCHROMIC DISPLAY DRIVER CIRCUIT

This application is a continuation of copending application Ser. No. 56,629, filed on July 11, 1979.

BACKGROUND OF THE INVENTION

The present invention relates in general to an electrochromic display and, more particularly, to a driving circuit for an electrochromic display having a plurality of segments for controlling display contrast among these segments.

It is preferable that an electrochromic display be driven by the constant current driving method in a coloring mode and by the constant voltage driving method in an erasing mode, as disclosed in a copending patent application Ser. No. 915,003 filed June 13, 1978, assigned to the present assignee, for example, The above stated driving method disclosed in the Ser. No. 915,003 had disadvantages in that, if and when a driving circuit was incorporated into a semiconductor chip, variations in the electrical properties of driving elements such as transistors formed within the semiconductor chip led to non-uniformity of coloration degree or depth among a plurality of segment electrodes included within an electrochromic display. The variations come from changes of conditions in manufacturing the driving elements.

In addition, if the driving method was applied to the ordinary electrochromic display having a plurality of segment electrodes, the sizes of various segment electrodes differing from each other, the coloration degree among these segment electrodes was non-uniform due to the application of the same amount of current at the same time thereto. In other words, this was due to the fact that there were variations in the amount of applied electric charge per unit size of the segment electrodes developed. This resulted in preventing all the segment electrodes from indicating a uniform display contrast.

OBJECTS AND SUMMARY OF THE INVENTION

Accordingly, it is the main object of the present invention to provide an improved driving circuit for an electrochromic display.

It is a further object of the present invention to provide an improved driving circuit for coloring all the segment electrodes included within an electrochromic display in a uniform coloration.

It is a further object of the present invention to provide an improved driving circuit for introducing the same amount of electric charge per unit size to all the segment electrodes of an electrochromic display during a predetermined coloration time.

It is another object of the present invention to provide an improved driving circuit for controlling a display contrast in segment electrodes within an electrochromic display.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To obtain the above objectives, pursuant to an embodiment of the present invention, a circuit for providing a constant coloring current to a plurality of segment electrodes of an electrochromic display comprises a plurality of switching elements respectively connected to the segment electrodes for enabling the application of the constant coloring current to the segment electrodes, and an element for changing switching timings of the switching elements.

A desirable amount of charge derived from the constant coloring current is applied to the segment electrodes regardless of the presence of the variations in electrical properties of the respective switching elements.

In another form of the present invention, element for changing switching timings comprises a generator for generating a constant voltage, and a modifier for modifying a value of the constant voltage.

In a further form of the present invention, the sizes of the respective switching elements, say, MOS transistors can be changed so that the factor W/L (W: the width of a channel of one of the MOS transistors, and L: the length of the channel) is selected so as to be properational to the dimensions of the corresponding segment electrodes.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

The present invention is mainly directed to a coloring circuit for causing coloration of segment electrodes of an electrochromic display. Therefore, an erasing circuit for erasing the colored segment electrodes is omitted from the drawings. If desired, see the U.S. patent application Ser. No. 915,003 diclosing a constant current driving circuit for coloring the segments and a constant voltage driving circuit for erasing the segments. The disclosure of the Ser. No. 915,003 application is incorporated herein by reference.

Figure 1:
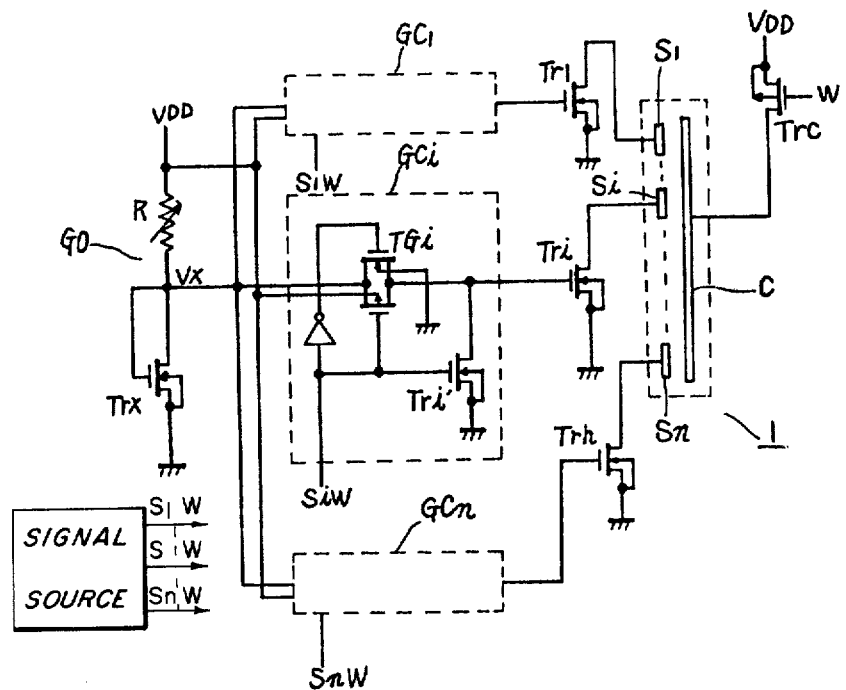
FIG. 1 is a block diagram of a coloring circuit according to the present invention.

FIG. 1 shows a coloring circuit of the present invention. An electrochromic display cell 1 is driven by the coloring circuit. The electrochromic display comprises an electrochromic material held by a counter electrode C and a plurality of segment electrodes Sl through Sn. The electrochromic material manifests reversible variations in the light absorption properties upon current supplied thereto.

The counter electrode C is provided as a common electrode for all the segment electrodes Sl through Sn. The segment electrodes Sl through Sn are formed so as to represent desirable symbols to be displayed. The coloring circuit is connected to the segment electrodes Sl through Sn. A desirable erasing circuit for applying a constant voltage driving method for erasing operations is also connected to the same segment electrodes Sl through Sn although not shown.

With reference to FIG. 1, a switching element, say, a metal oxide semiconductor (MOS) transistor Trc is connected to the counter electrode C. Writing timing signals W of, say, a low level are admitted to the gate of the MOS transistor Trc, thereby supplying the counter electrode C with a voltage VDD through the MOS transistor Trc.

Each of switching elements, say, MOS transistors Trl through Trn is connected to the segment electrodes Sl to Sn.

Writing control signals, say, Siw as recited hereinbelow allow a relevant MOS transistor Tri selected from the MOS transistors Trl to Trn to switch according to the application of a voltage Vx to the gate of the MOS transistor Tri.

Consequently, a constant current I flows through the counter electrode C to a selected segment electrode Si with the aid of the applied voltage VDD. So a desirable amount of a charge defined by the result of multiplying the constant current I with a coloration time period T is applied to the selected segment electrode Si for coloring purposes.

At least the MOS transistors Trl to Trn are all manufactured in a semiconductor chip. Needless to say, it will be apparent that the overall coloring circuit can be incorporated into the semiconductor chip.

The constant current I is obtained as a drain current in a saturated region of the MOS transistors Trl through Trn as defined by the following equation:

$$I = -(\mu\epsilon/2t)(W/L)(VX-VT)^2 \quad (1)$$

where
- $\mu$: a value of mobility
- $\epsilon$: dielectric constant of an oxided film for the gate electrode
- t: the thickness of the oxided film
- w: the width of a channel
- L: the length of the channel
- Vt: the threshold voltage for the MOS transistor Two factors VT and $\mu\epsilon/2t$ in the equation (1) are considerably varied during manufacture of the respective MOS transistors Trl to Trn as far as the MOS transistors Trl through Trn are not manufactured in the same semiconductor chip.

If and when the two factors VT and $\mu\epsilon/2t$ are not identical with respect to at least two MOS transistors, it can not be expected that the relevant segment electrodes associated with the two MOS transistors will be uniformly colored due to the difference in an amount of the constant current being applied thereto.

On the contrary, when the MOS transistors Trl to Trn are manufactured in the same semiconductor chip, there is no possibility of varying the factors VT and $\mu\epsilon/2t$ between those transistors. That should be no problem.

Even if the variations in the values of the factors, say, VT and $\mu\epsilon/2t$ develop, it can be compensated for by the present invention as described below.

To this end, there are provided a gate voltage generator Go and a plurality of gate controllers GCl to GCn. The gate voltage generator Go is commonly connected to all the MOS transistors Trl to Trn. The gate controllers GCl to GCn are also connected to the MOS transistors Trl to Trn.

The gate voltage generator Go is provided by connecting a variable resistor R to an MOS transistor Trx in series, so that a desirable value of a voltage VX appearing at the connection between the variable resistor R and MOS transistor Trx is developed. The value of the voltage VX is represented by the equation:

$$VX = VGS = VDD - IGS \cdot R \quad (2)$$

where
- VGS: the voltage between the source and the gate of the MOS transistor Trx
- VDD: the voltage of a power source
- IGS: the current between the source and the gate of the MOS transistor Trx The gate controllers GCl through GCn are provided for controlling the respective MOS transistors Trl to Trn. When the predetermined writing control signals Siw in, say, a low level are applied to the corresponding gate controller GCi, the voltage VX is then introduced into the gate of the selected MOS transistor Tri through a transmission gate TGi contained within the gate controller GCi, so that the MOS transistor Tri switches.

The constant current I applied at this time is defined by the equation (1), whereby coloration operations for the related segment electrode Si is taken place.

When the writing control signals Siw is absent, in other words, in a high level, the transmission gate TGi is placed in a nonconductive condition. In addition, another MOS transistor Tri' connected between the gate of the MOS transistor Tri and the ground becomes conductive. As a result, the MOS transistor Tri changes into nonconductive conditions owing to the application of the ground level into the gate thereof. This is referred to as memory operations of the segment electrode Si with the help of the so called inherent memory effect, where the colored conditions or the erased conditions thereof are maintained.

The writing control signals $S_1W$ to $S_nW$ are provided from a SIGNAL SOURCE as illustrated in FIG. 1.

As stated earlier, the gate voltage generator Go is employed so as to control a value of the voltage Vx applied to the gates of the MOS transistors Trl through Trn. The MOS transistors Trl through Trn are switched according to the application of a suitable amount of the gate voltage. Therefore, switching operations of the MOS transistors Trl to Trn are adjusted by the gate voltage generator Go, whereby coloration degree of the segment electrodes Sl to Sn can be controlled.

In other words, the variations in electrical properties of the respective MOS transistors Trl to Trn can be compensated for, so that a desirable display contrast appearing in all the segment electrodes Sl to Sn can be selected at the same degree even under the coloration operations by the constant current driving, providing that all the segment electrodes are identical in size.

If and when there is any among the segment electrodes Sl to Sn where the coloration depth is slight or shallow, it can be performed that the related MOS transistor is adjusted so as to switch after the completion of the coloration operation to be desired.

Figure 2:
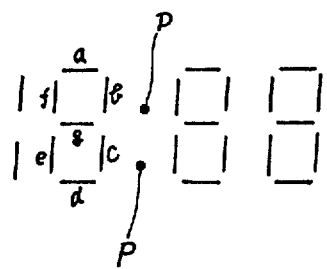
FIG. 2 is a front view of an electrochromic display containing a plurality of segment electrodes to which the coloring current is applied for coloring the electrodes.

In another form of the present invention, FIG. 2 shows an example of the electrochromic display of the type in which there are provided a plurality of the segment electrodes of different size from each other. Such electrochromic displays have been utilized for an electronic apparatus, say, an electronic calculator, an electronic timepiece and the like.

The electrochromic display shown in FIG. 2 is concerned with the electronic timepiece, where there are formed a plurality of horizontal segments a, g and d, a plurality of vertical segments b, c, e and f, and colon mark segments p. The dimensions of the horizontal segments and the vertical segments are considerably different from that of the colon mark segments. For example, it is shown in a practical electrochromic display that the dimensions of the horizontal segment a are selected to be 1 mm$^2$ while the colon mark segment p is selected to be 0.28 mm$^2$. There are also differences in the size between the horizontal segments and the vertical segments to enhance the visibility of the display.

As mentioned above, an amount of the electric charge applied to any segment electrodes is defined by the results of multiplying the quantity of the constant current I with the coloration time period T. The constant current I is represented by the equation (1).

Equalization of an amount of the electric charge applied to the unit size of the segments during the same coloration time period can be performed by means of the selection of a value of the constant current I in proportion to the total size of the segment. The factor W/L contained within the equation (1) can be freely adjusted with the aid of the change of a mask pattern for making the MOS transistors Tr1 to Trn. Providing that the factor W/L is selected so as to be proportional to the size of the respective segment electrodes S1 to Sn, the constant current I admitted to the respective segment electrodes S1 to Sn becomes proportional to the size thereof to thereby equalize the amount of an applied charge per unit size.

It is now assumed that the sizes of the horizontal segment a and the colon mark segment p shown in FIG. 2 are Sa and Sp, respectively. If the following relation is found to hold, an amount of the applied charge per unit size of the both segments a and p is equalized:

$$Sa: Sp = \left(\frac{W}{L}\right)_a : \left(\frac{W}{L}\right)_p$$

where $$\left(\frac{W}{L}\right)_a :$$

the factor W/L in an MOS transistor Tra corresponding to the horizontal segment a $$\left(\frac{W}{L}\right)_p :$$

the factor W/L in another MOS transistor Trp corresponding to the colon mark segment p Under these circumstances, the display contrast over the horizontal segment a and the colon mark segments p becomes identical. This equalization principle can be applied to all the segments to indicate the same display contrast therein.

The factor W/L contained within the equation (1) can be freely adjusted according to the modification of the mask pattern enough to allow for the variations in the size of the segments. However, the other factors $\mu\epsilon/2t$ and VT contained within the equation (1) are very difficult to be controlled accurately because of the difficulty in controlling processes therefor.

The above mentioned gate controllers GC1 to GCn can be neglected when all the writing control signals Slw to Snw are in the same fixed voltage and directly applied to the gates of the respective MOS transistors Tr1 to Trn. This is becuase the gate controllers GC1 to GCn are provided for supplying the MOS transistors Tr1 to Trn with a common fixed voltage Vx.

While only certain embodiments of the present invention have been described, it will be apparent to those skilled in the art that various changes and modifications may be made therein without departing from the spirit and scope of the invention as claimed.

What is claimed is:

1. Coloring circuit means for driving a plurality of segment electrodes of differing sizes in an electrochromic display, comprising:

means for providing a constant current to the segment electrodes; and a plurality of MOS transistors respectively connected to the segment electrodes for enabling the application of the constant current to the segment electrodes, the sizes of the respective MOS transistors being selected so that a factor W/L associated with those MOS transistors is proportional to the dimensions of the respective corresponding segment electrodes associated therewith, where W is the width of a channel of the MOS transistor and L is the length of the channel, controlling said constant current to supply to each of the said segment electrodes a substantially identical electric charge per unit size, resulting in uniform coloration thereof.

2. The coloring circuit means according to claim 1, wherein said MOS transistors are switched in response to the application of a constant voltage thereto, the switching of the MOS transistors enabling the application of the constant current to the respective segment electrodes.

3. The coloring circuit means according to claim 2, wherein the MOS transistors are manufactured in a semiconductor chip by means of a mask pattern.

4. Driver circuit means for an electrochromic display capable of producing uniform display contrast thereon, said electrochromic display including a counter electrode and a plurality of segment electrodes of various sizes, comprising:

constant current means connected to said counter electrode for providing a constant current in response to a write signal applied thereto;

a plurality of switching means connected, respectively, to said plurality of segment electrodes, each of said switching means having a gate means and switching to a conducting state in response to respective constant voltage switching signals applied to said gate means to control the flow of said constant current into corresponding ones of said segment electrodes;

means providing write command signals corresponding one to each of said switching means and having first and second control states;

control circuit means connected to said plurality of switching means for selectively generating a like plurality of constant voltage switching signals, said control circuit means including:

constant voltage means for providing a constant voltage signal; and a plurality of gate controlling circuit means interconnecting said constant voltage means and respective ones of said gate means of said plurality of switching means and responsive to said constant voltage signal and respective ones of said write command signals in the first said control state for generating said plurality of constant voltage switching signals in response thereto, said switching signals switching respective ones of said switching means to said conducting state and maintaining said conducting states for respective durations sufficient to apply said constant current to said segment electrodes for coloring said segment electrodes by a uniform application of charge per unit electrode size.

5. A driver circuit in accordance with claim 4, wherein each of said plurality of gate controlling circuit means further comprises:

transistor switching means each having a first terminal connected with a respective one of said gate means, a second terminal connected to ground potential, and a third terminal driven by a respective one of said write command signals in the second said control state for switching said switching means to a conducting state when writing is not commanded thereby applying said ground potential to said gate means of said switching means and rendering the latter non-conductive to preclude further application of said constant current to a corresponding one of said segments.

6. A driver circuit in accordance with claim 4 or 5 wherein said constant voltage means comprises means for varying the value of said constant voltage signal.

* * * * *